United States Patent [19]

Morikawa et al.

[11] Patent Number: 5,373,050
[45] Date of Patent: Dec. 13, 1994

[54] SELF-EMULSIFIABLE ISOCYANATE-TERMINATED PREPOLYMER, AND AQUEOUS COATING COMPOSITION AND AQUEOUS ADHESIVE COMPOSITION EMPLOYING THE SELF-EMULSIFIABLE ISOCYANATE-TERMINATED PREPOLYMER

[75] Inventors: Yukihiro Morikawa; Koichi Uehara, both of Yokohama; Shin Konishi, Fujisawa, all of Japan

[73] Assignee: Nippon Polurethan Industry Co., Ltd., Tokyo, Japan

[21] Appl. No.: 138,241

[22] Filed: Nov. 24, 1993

[30] Foreign Application Priority Data

Dec. 25, 1992 [JP] Japan .................................. 4-358228

[51] Int. Cl.⁵ .............................................. C08L 75/00
[52] U.S. Cl. .................................. 524/591; 524/839; 528/49; 528/59; 528/73
[58] Field of Search ................... 524/591, 839; 528/49, 528/59, 73

[56] References Cited

U.S. PATENT DOCUMENTS 4,663,377  5/1987  Hombach et al. ................ 524/196

OTHER PUBLICATIONS

Japanese Patent Publication for Opposition Gasette No. Hei. 4-15270, published Mar. 17, 1992, and partial translation.

*Primary Examiner*—Maurice J. Welsh
*Attorney, Agent, or Firm*—Davis Hoxie Faithfull & Hapgood

[57] ABSTRACT

The present invention is directed to a self-emulsifiable isocyanate-terminated prepolymer, having an average NCO functionality of from 2.0 to 3.5, which is prepared from: (a) a polyisocyanate mainly composed of at least one of aliphatic polyisocyanates, alicyclic polyisocyanates, and aromatic polyisocyanates, (b-1) a hydrophilic surfactant having at least one active hydrogen group capable of reacting with an isocyanate group, and (b-2) an aliphatic compound of 8 or more carbons, and/or a fatty acid ester in which the total of the carbons of a starting fatty acid and a starting hydroxyl-group-having compound is 8 or more, the aliphatic compound and the fatty acid ester having at least one active hydrogen group capable of reacting with the isocyanate group.

25 Claims, 1 Drawing Sheet

SELF-EMULSIFIABLE ISOCYANATE-TERMINATED PREPOLYMER, AND AQUEOUS COATING COMPOSITION AND AQUEOUS ADHESIVE COMPOSITION EMPLOYING THE SELF-EMULSIFIABLE ISOCYANATE-TERMINATED PREPOLYMER

BACKGROUND OF THE INVENTION

1. Field of the Invention

The present invention relates to a self-emulsifiable isocyanate-terminated prepolymer. More particularly, the present invention relates to a product which is suitable for an aqueous coating composition, and is suitable for an additive to an aqueous adhesive composition based on a water-soluble polymer and/or an aqueous emulsion.

2. Related Background Art

An example of a known self-emulsifiable polyisocyanate composition is a polyisocyanate composition which comprises (a) at least one aliphatic polyisocyanate and (b) a quantity of emulsifier which is sufficient to render component (a) dispersible in water or which is a reaction product of an aliphatic polyisocyanate with a nonionic polyalkylene ether alcohol as disclosed in U.S. Pat. No. 4,663,377. It is well-known that such self-emulsifiable polyisocyanate compositions are added to acrylic resin solutions, synthetic rubber solutions, polyurethane solutions, etc. for the purpose of improving water-resistance, heat-resistance, and adhesiveness.

Known self-emulsifiable polyisocyanate compositions, however, are disadvantageous in that the stability of the aqueous dispersion thereof and the chemical stability of the isocyanate group in the dispersion are not simultaneously achieved. In other words, when the polyisocyanate compound is modified to have higher affinity to water for the purpose of improving the dispersibilty in water, the isocyanate groups become more reactive to water. Thus, the isocyanate-group content in aqueous dispersion decreases with lapse of time. The decrease of the isocyanate-group content changes the properties of the composition employing the polyisocyanate compounds. On the contrary, when the polyisocyanate compound is modified to have longer pot life, the dispersibility of the compound in water becomes poor and the composition is not capable of improving sufficiently the properties of the composition employing the compound. Therefore, a self-emulsifiable polyisocyanate compound is strongly demanded which is sufficiently stable and usable for a long time in water dispersion.

After comprehensive study, it was found that both of the water dispersion stability of a polyisocyanate compound and the chemical stability of the isocyanate group in water are simultaneously achieved by introducing to the polyisocyanate compound a hydrophilic chain like a polyalkylene ether alcohol as conventionally conducted and additionally introducing thereto a lipophilic chain of an appropriate chain length in a well-balanced ratio to protect the isocyanate group surface-chemically. The present invention has been completed based on the above findings.

SUMMARY OF THE INVENTION

According to the present invention, there is provided a self-emulsifiable isocyanate-terminated prepolymer which gives highly stable dispersion in water and yet has high chemical stability of the isocyanate group in water dispersion, and thereby excellent in workability and cost.

The self-emulsifiable isocyanate-terminated prepolymer of the present invention has an average NCO functionality of from 2.0 to 3.5, and it is prepared from (a) a polyisocyanate mainly composed of at least one of aliphatic polyisocyanates, alicyclic polyisocyanates, and aromatic polyisocyanates, (b-1) a hydrophilic surfactant having at least one active hydrogen group capable of reacting with an isocyanate group, and (b-2) an aliphatic compound of 8 or more carbons, and/or a fatty acid ester in which the total of the carbons of a starting fatty acid and a starting hydroxyl-group-having compound is 8 or more, the aliphatic compound and the fatty acid ester having at least one active hydrogen group capable of reacting with the isocyanate group.

The present invention also provides an aqueous coating composition comprising the self-emulsifiable isocyanate-terminated prepolymer and water.

The present invention further provides an aqueous adhesive composition comprising the self-emulsifiable isocyanate-terminated prepolymer and an aqueous adhesive based on a water-soluble high polymer and/or an aqueous emulsion.

DETAILED DESCRIPTION OF THE PREFERRED EMBODIMENT

Figure 1:
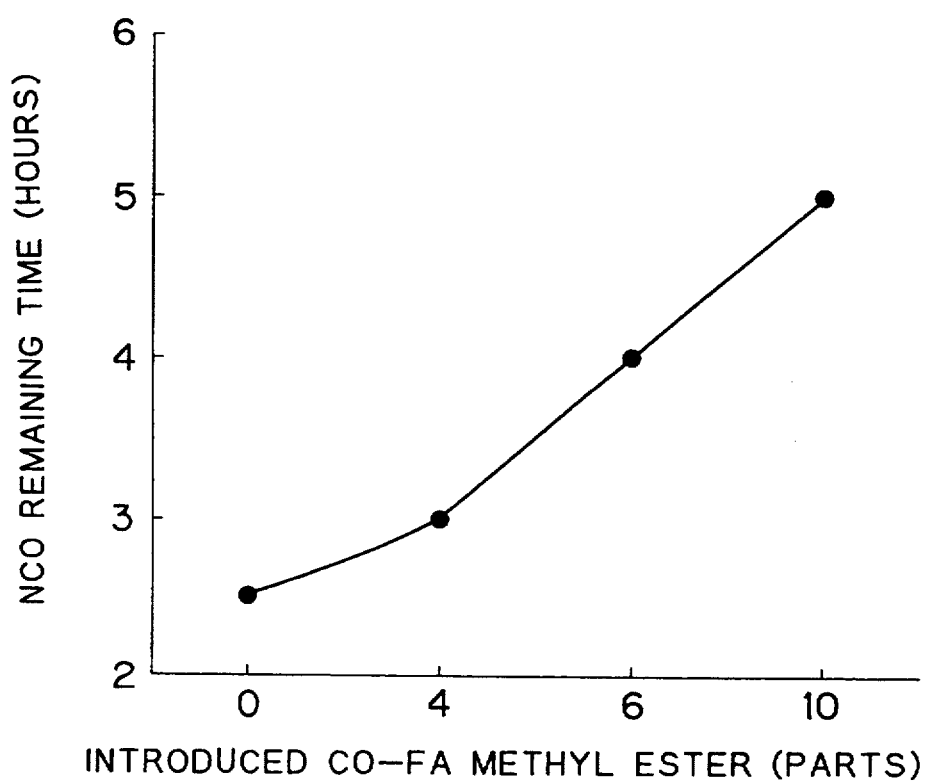
FIG. 1 shows the effect of introduction of CO-FA methyl ester, being a lipophilic chain, by the results obtained by using Examples 1 to 3 and Comparative Example 2.

The self-emulsifiable isocyanate-terminated prepolymer of the present invention has an average NCO functionality of from 2.0 to 3.5, and it is prepared from (a) a polyisocyanate mainly composed of at least one of aliphatic polyisocyanates, alicyclic polyisocyanates, and aromatic polyisocyanates, (b-1) a hydrophilic surfactant having at least one active hydrogen group capable of reacting with an isocyanate group, and (b-2) an aliphatic compound of 8 or more carbons, and/or a fatty acid ester in which the total of the carbons of a starting fatty acid and a startling hydroxyl compound is 8 or more, the aliphatic compound and the fatty acid ester having at least one active hydrogen group capable of reacting with the isocyanate group.

The examples of the component (a) of the self-emulsifiable isocyanate-terminated prepolymer include isocyanurate group-having polyisocyanates derived from 1,6-hexamethylene diisocyanate (HDI) and/or isophorone diisocyanate (IPDI); and polyisocyanates of the above diisocyanates having a uretdione group, those having a uretdione group and an isocyanurate group, those having a urethane group, those having an allophanate group, those having a biuret group, those having a carbodiimide group, and those having a uretonimine group; and combinations of two or more thereof.

The examples of the component (b-1) include polyethylene ether alcohols having at least three ethylene oxide units.

The aqueous coating composition of the present invention comprises the above self-emulsifiable isocyanate-terminated prepolymer and water.

The aqueous adhesive composition of the present invention comprises the above self-emulsifiable isocyanate-terminated prepolymer and an aqueous adhesive based on a water-soluble high polymer and/or an aqueous emulsion.

The specific examples of the component (a) constituting the self-emulsifiable isocyanate-terminated prepolymer include aromatic diisocyanates such as phenylene diisocyanate, tolylene diisocyanate, xylene diisocyanate, tetramethylxylene diisocyanate, naphthylene diisocyanate, diphenylmethane diisocyanate, and isomers thereof, and polymers thereof; aliphatic diisocyanates such as 1,6-hexamethylene diisocyanate, 1,12-dodecane diisocyanate, and polymers thereof; and alicyclic diisocyanates such as cyclohexane diisocyanate, dicyclohexylmethane diisocyanate, isophorone diisocyanate, and polymers thereof. Further, the polyisocyanates include isocyanate-terminated compounds derived by reaction of the above compound and an active hydrogen group-having compound, and modified isocyanates formed by reaction of the above compounds such as uretdione-forming reaction, isocyanurate-forming reaction, carbodiimide-forming reaction, and biuret-forming reaction.

The isocyanurate group-having polyisocyanates, the uretdione group-having polyisocyanates, and the uretdione/isocyanurate group-having polyisocyanates derivable from 1,6-hexamethylene diisocyanate and/or isophorone diisocyanate, constituting the self-emulsifiable isocyanate-terminated prepolymer of the present invention are produced by the process shown below. The starting polyisocyanate is allowed to react in the presence of a uretdione-forming catalyst or an isocyanurate-forming catalyst usually at a temperature of from 0° to 90° C. in the absence of or presence of a solvent. The known uretdione-forming catalyst and the known isocyanurate-forming catalyst include tertiary amines, alkyl-substituted ethylenimines, tertiary alkylphosphines, metal acetylacetonates, metal salts of organic acids, and combinations thereof. If necessary, a cocatalyst such as a compound having a phenolic or alcoholic hydroxyl group may be used in addition to the above catalyst. The solvent for the reaction includes inert solvents conventionally used in polyurethane industry, such as aromatic solvent, e.g., toluene, xylene, etc.; ketones e.g., methyl ethyl ketone, methyl isobutyl ketone, etc.; esters e.g., ethyl acetate, butyl acetate, etc.; and glycol ether-esters, e.g., propylene glycol methyl ether acetate, ethyl 3-ethoxypropionate, etc. In some cases, the reaction is allowed to proceed in a polyol or a plasticizer such as DOP which is liquid at the reaction temperature. The catalyst can be inactivated by use of a reaction terminator such as phosphoric acid, methyl p-toluenesulfonate, sulfur, and the like.

Of the aforementioned polyisocyanates, aliphatic polyisocyanates and alicyclic polyisocyanates are preferred in consideration of the stability of the aqueous dispersion, chemical stability of the isocyanate group in aqueous dispersion, and non-yellowing property. Of these polyisocyanates, particularly preferred are polyisocyanates containing an isocyanurate ring having average NCO functionality of two or more because of their high heat resistance and high crosslinkability.

The nonionic compounds useful as the hydrophilic surfactant (b-1), which constitute the self-emulsifiable isocyanate-terminated prepolymer of the present invention and have at least one active hydrogen group capable of reacting an isocyanate group, include polyalkylene ether alcohols, and polyoxyalkylene fatty acid esters.

In the preparation of the polyalkylene ether alcohol, an active hydrogen compound is used as the initiator, the active hydrogen compound including methanol, n-butanol, cyclohexanol, phenol, ethylene glycol, propylene glycol, aniline, trimethylolpropane, glycerin, and so forth. Of these, lower alcohol is preferred which gives higher hydrophilicity in consideration of the water dispersion stability.

The fatty acid used for the preparation of the polyoxyalkylene fatty acid ester include acetic acid, propionic acid, and butyric acid. Of these, lower fatty acid is preferred which gives higher hydrophilicity in consideration of the water dispersion stability.

The polyether chain in the polyalkylene ether alcohol or the polyoxyalkylene fatty acid ester is an ethylene oxide chain having preferably 3 to 90, more preferably 5 to 50 alkylene oxide units, which may be a mixed alkylene oxide chain having ethylene oxide units in a ratio of 70% or more of the entire alkylene oxide units.

The ionic compounds useful as the hydrophilic surfactant (b-1) constituting the self-emulsifiable isocyanate-terminated prepolymer of the present invention and having at least one active hydrogen group capable of reacting with an isocyanate group include anionic compounds such as fatty acid salts, sulfonate acid salts, phosphate esters, and sulfate esters; cationic compounds such as primary amine salts, secondary amine salts, tertiary amine salts, quaternary ammonium salts, and pyridinium salts; and amphoteric compounds such as sulfobetaine.

The aliphatic compound (b-2) of 8 or more carbons having at least one active hydrogen group capable of reacting with an isocyanate group and constituting the self-emulsifiable isocyanate-terminated prepolymer of the present invention includes octyl alcohol, capryl alcohol, nonyl alcohol, decyl alcohol, undecyl alcohol, lauryl alcohol, tridecyl alcohol, myristyl alcohol, pentadecyl alcohol, cetyl alcohol, and cinnamyl alcohol. The fatty acid for the preparation of the fatty acid ester (b-2), in which the total of the carbons of a starting fatty acid and a starting hydroxyl-group-having compound is 8 or more, constituting the self-emulsifiable isocyanate-terminated prepolymer of the present invention and having at least one active hydrogen group capable of reacting with an isocyanate group includes α-hydroxypropionic acid, hydroxysuccinic acid, dihydroxysuccinic acid, ε-hydroxypropane-1,2,3-tricarboxylic acid, hydroxyacetic acid, α-hydroxybutyric acid, hydroxystearic acid, ricinolic acid, ricinoelaidic acid, ricinostearolic acid, salicylic acid, and mandelic acid. The hydroxyl compound for the preparation of the fatty acid ester (b-2) includes methyl alcohol, ethyl alcohol, propyl alcohol, isopropyl alcohol, butyl alcohol, dodecyl alcohol, and lauryl alcohol. It is assumed that the lipophilic chain portion introduced by the reaction of the aliphatic compound and/or the fatty acid ester (b-2) with the polyisocyanate (a), and inhibits surface-chemically the reaction of the neighboring unreacted NCO group with the surrounding water molecules by steric hindrance or surface chemical effect of the lipophilic chain. Accordingly, the lipophilic chain is required to have a certain chain length to be effective, and the active hydrogen group reacting with an isocyanate group is preferably located not at the terminal site but near the center portion of the main chain.

The self-emulsifiable isocyanate-terminated prepolymer can be produced through a known process generally in the absence of a solvent, but may be carried out in the presence of a solvent, a catalyst and the like which are conventionally used in polyurethane industry, as desired, at a moderately elevated reaction temperature of from 50° to 130° C.

The aliphatic compound and/or the fatty acid ester (b-2), in the production of the self-emulsifiable isocyanate-terminated prepolymer of the present invention, is used preferably in an amount of from 0.1 to 25.0 mol %, more preferably from 2.0 to 15.0 mol % in terms of the relative content of the active hydrogen group based on the NCO content of the polyisocyanate component (a). An insufficient amount of the aliphatic compound and/or the fatty acid ester (b-2) results in insufficient surface-chemical protection of the isocyanate group, and thereby shortens the pot life of a water dispersion thereof, and is undesirable. On the contrary, an excessive amount thereof results in lower stability of the aqueous dispersion, and is undesirable.

The hydrophilic surfactant (b-1), in the production of the self-emulsifiable isocyanate-terminated prepolymer of the present invention, is used preferably in an amount of from 1.0 to 30.0 mol %, more preferably from 8.0 to 20.0 mol % in terms of the relative content of the active hydrogen group based on the NCO content of the polyisocyanate component (a). An insufficient amount of the hydrophilic surfactant (b-1) results in poor dispersibility of the surfactant-modified isocyanate-terminated prepolymer, and causes, for example, sedimentation undesirably. On the contrary, an excessive amount of the hydrophilic surfactant (b-1) results in undesirably high affinity of the modified isocyanate-terminated prepolymer to water, unless the amount of the introduced aliphatic compound and/or the fatty acid ester (b-2) is increased in correspondence thereto, thus causing poor chemical stability of the isocyanate group in water. Further, an excessive amount of the hydrophilic surfactant (b-1) and the aliphatic compound and/or the fatty acid ester (b-2) causes relative decrease of the NCO content and the average NCO functionality of the modified isocyanate product. Thus, such excessive amount should be avoided.

Accordingly, the degree of the modification of the polyisocyanate component (a) by the hydrophilic surfactant (b-1), and the aliphatic compound and/or fatty acid ester (b-2) should be controlled such that the average NCO functionality is not less than 2.0.

The self-emulsifiable isocyanate-terminated prepolymer having an average NCO functionality of from about 2.0 to 3.5 is prepared by well-balanced introduction of the hydrophilic surfactant (b-1), and the aliphatic compound and/or fatty acid ester (b-2) into the polyisocyanate component (a) as described above. In the self-emulsifiable isocyanate-terminated prepolymer of the present invention, the dispersion stability in water is improved by introduction of a hydrophilic chain, and concurrently the chemical reaction of the isocyanate group with water in an aqueous emulsion is hindered surface-chemically by introduction of a lipophilic chain of a suitable chain length in consideration of the balance between the lipophilic chain and the hydrophilic chain.

The self-emulsifiable polyisocyanate produce of the present invention may contain, if necessary, an additional substance such as an antioxidant, a UV-absorber, a heat resistance-improving agent, a coloring agent, an inorganic or organic filler, a plasticizer, a lubricant, an antistatic agent, a reinforcing agent, and a catalyst.

The self-emulsifiable isocyanate-terminated prepolymer of the present invention is readily dispersible in water by mixing. The aqueous dispersion is useful as an aqueous coating material, a sealer, an aqueous paint, an aqueous adhesive, or the like for wooden materials, plastics, metallic materials, inorganic materials, and so forth.

The aqueous dispersion serves as a coating material, a sealer, an aqueous paint, or an adhesive having excellent adhesiveness, since the isocyanate group which exists relatively stably in the aqueous dispersion reacts with an active hydrogen group on the surface of a base material when applied on the base material. Furthermore, the aqueous dispersion, long time after the formulation, having the isocyanate group consumed is still in a stable emulsion state having a particle size of about 0.1 $\mu$m to 0.3 $\mu$m. This emulsion, on drying at an ordinary temperature or an elevated temperature, gives a hard and tough coating film mainly composed of a urea compound, and is useful as a film, a sheet, or a coating material of a variety of base materials. In the case where adhesiveness to a base material is particularly required, it is desirable to apply the dispersion in the state where isocyanate groups exist.

The self-emulsifiable isocyanate-terminated prepolymer of the present invention is useful as a hardener or crosslinking agent for aqueous coating materials, sealers, aqueous paints, aqueous adhesives, and the like which are based on a water-soluble high polymer and/or an aqueous emulsion. The addition of the product of the present invention gives the effects of improvements in heat resistance, water resistance, adhesiveness, and so forth as in conventional self-emulsifiable polyisocyanate compositions. The improvement effects continue sufficiently and stably over a longer term in the self-emulsifiable isocyanate-terminated prepolymer of the present invention, since the reaction of the isocyanate group with water in an aqueous phase is hindered by the introduced lipophilic chain. The self-emulsifiable isocyanate-terminated prepolymer may be added in a state of an aqueous dispersion, of a dilution with a solvent conventionally used in urethane industry, or, if desired, of the product itself directly.

The water-soluble high polymer useful in the present invention includes polyvinyl alcohol, water-soluble ethylene-vinyl acetate copolymers, polyethylene oxide, water-soluble acrylic resins, water-soluble epoxy resins, water-soluble cellulose derivatives, water-soluble polyester resins, water-soluble lignin derivatives, and water-soluble polyols such as water-soluble acrylic polyols and water-soluble polyester-polyols.

The aqueous emulsion used in the present invention may be any latex or any emulsion, including rubber latices such as styrene-butadiene copolymer latices, acrylonitrile-butadiene copolymer latices, methyl methacrylate-butadiene copolymer latices, chloroprene latices, and polybutadiene latices; polyacrylic ester latices, and polyvinylidene latices, and carbonyl-modified matter thereof; and further, polyvinyl chloride emulsions, urethane-acryl emulsions, silicone-acryl emulsions, vinyl acetate-acryl emulsions, urethane emulsions, acryl emulsions; and the like.

The self-emulsifiable isocyanate-terminated prepolymer of the present invention exhibits excellent water dispersibility and excellent stability in a state of dispersion in water, which is achieved by introduction of both a hydrophilic chain for aqueous dispersion stabilization and a lipophilic chain to the polyisocyanate in a well-balanced state to protect intentionally the isocyanate group by a surface-chemical method.

In uses for aqueous coating materials and aqueous adhesives, the isocyanate-terminated prepolymer of the present invention can be used stably in aqueous dispersion for a long term.

The present invention is described in more detail by reference to Examples without limiting the invention thereby in any way. The terms "part" and "%" are based on weight unless otherwise mentioned.

[Examples of Preparation of Polyisocyanate Component (a) Constituting Self-Emulsifiable Isocyanate-Terminated Prepolymer]

PREPARATION OF MODIFIED HDI

Preparation Example 1

In a reactor equipped with a stirrer, a thermometer, a nitrogen-sealing tube, and a cooler, there were placed 300 parts of hexamethylene diisocyanate (HDI), and 2.4 parts of 1,3-butanediol. The inside of the reactor was purged with nitrogen, and the contents in the reactor were heated to 80° C. with stirring and allowed to react at 80° C. for 2 hours. The isocyanate group content of the reaction product was found to be 48.8%.

Thereto, 0.06 part of potassium caprate as the catalyst, and 0.3 parts of phenol as the cocatalyst were added, and isocyanurate-forming reaction was allowed to proceed at 60° C. for 4.5 hours.

Then 0.042 part of phosphoric acid was added to the reaction mixture to quench the reaction. The reaction mixture was stirred at the reaction temperature for a further one hour. The unreacted HDI was removed by the thin film distillation at 120° C. and 0.01 Torr.

The resulting product was a pale yellow transparent liquid, having an isocyanate group content of 21.1%, a viscosity of 2200 cP/25° C., and a free HDI content of 0.4%. The resultling product was confirmed by FT-IR and $^{13}$C-NMR to have an isocyanate group, an isocyanurate group, and a urethane group, but did not have a detectable uretdione group.

This modified HDI is hereinafter referred to as "A-1".

Preparation Example 2

In a reactor equipped with a stirrer, a thermometer, a nitrogen-sealing tube, and a cooler. The reaction was allowed to proceed in a similar manner as in Preparation Example 1 by use of 300 parts of HDI, 10.2 parts of 1,3-butanediol, 0.06 part of potassium propionate as the catalyst, 0.3 part of phenol, and 0.072 part of phosphoric acid.

After the reaction of HDI and 1,3-butanediol, the resulting product had an isocyanate group at a content of 45.3%.

After the thin film distillation the resulting product had an isocyanate group content of 19.2%, a viscosity of 2800 cP/25° C., and a free HDI content of 0.3%. The resulting product was confirmed, by FT-IR and $^{13}$C-NMR, to have an isocyanate group, an isocyanurate group, and a urethane group, but did not have a detectable uretdione group.

This modified HDI is hereinafter referred to as "A-2".

Preparation Example 3

In a reactor equipped with a stirrer, a thermometer, a nitrogen-sealing tube, and a cooler, there were placed 3000 parts of HDI, and 6.0 parts of trioctylphosphine as the catalyst. The contents in the reactor were heated to a temperature of 65° to 70° C. with stirring and allowed to react at this temperature for 6 hours. Thereto 3.5 parts of phosphoric acid was added to the reaction mixture to quench the reaction. The resulting product was a pale yellow transparent liquid having isocyanate group at a content of 30.0%.

Then the unreacted HDI was removed therefrom by the thin film distillation at 120° C. and 0.01 Torr to obtain a pale yellow transparent liquid, having an isocyanate group at a content of 18.7%. The resulting product was confirmed, by FT-IR and $^{13}$C-NMR, to have an isocyanate group, a uretdione group, and an isocyanurate group. The isocyanate group content was determined by reaction of the resulting liquid with n-butylamine in propylene glycol methyl ether acetate as a high boiling solvent at the boiling temperature and subsequent back titration with hydrochloric acid, and found to be 30.8%. Accordingly the uretdione group content was 12.1%, and the isocyanurate group content was 19.2%.

This modified HDI containing uretdione group-/isocyanurate group is hereinafter referred to as "A-3".

[Examples of Production of Self-Emulsifiable Isocyanate-Terminated Prepolymer]

EXAMPLE 1

100 Parts of the modified HDI A-1 was placed in a reactor equipped with a stirrer, a thermometer, a nitrogen-sealing tube, and a cooler, and thereto were added 16 parts of polyoxyethylene methyl ether (hydroxyl value: 140, made by Toho Chiba Kogyo K. K., hereinafter referred to as "methoxyPEG#400") and 4 parts of methyl ricinoleate (hydroxyl value: 160, made by Ito Seiyu K. K., hereinafter referred to as "CO-FA methyl ester"). The mixture was heated, and allowed to react at 75° C. for 3 hours. Thereby an isocyanate-terminated prepolymer (A) was obtained which was pale yellow and transparent, and had an NCO content of 15.8% and a viscosity of 890 cP/25° C. This prepolymer was self-emulsifiable.

EXAMPLE 2

100 Parts of the modified HDI A-1 was placed in a reactor equipped with a stirrer, a thermometer, a nitrogen-sealing tube, and a cooler, and thereto were added 16 parts of methoxyPEG#400, and 6 parts of CO-FA methyl ester. The mixture was heated, and allowed to react at 75° C. for 3 hours. Thereby an isocyanate-terminated prepolymer (B) was obtained which was pale yellow and transparent, and had an NCO content of 15.3% and a viscosity of 940 cP/25° C. This prepolymer was self-emulsifiable.

EXAMPLE 3

100 Parts of the modified HDI A-1 was placed in a reactor equipped with a stirrer, a thermometer, a nitrogen-sealing tube, and a cooler, and thereto were added 16 parts of methoxyPEG#400, and 10 parts of CO-FA methyl ester. The mixture was heated, and allowed to react at 75° C. for 3 hours. Thereby an isocyanate-terminated prepolymer (C) was obtained which was pale yellow and transparent, and had an NCO content of 14.3% and a viscosity of 2580 cP/25° C. This prepolymer was self-emulsifiable.

EXAMPLE 4

100 Parts of the modified HDI a-2 was placed in a reactor equipped with a stirrer, a thermometer, a nitrogen-sealing tube, and a cooler, and thereto were added 20 parts of methoxyPEG#400, and 18 parts of butyl ricinoleate (hydroxyl value: 145, made by Ito Seiyu K. K.). The mixture was heated, and allowed to react at 75° C. for 3 hours. Thereby an isocyanate-terminated prepolymer (D) was obtained which was pale yellow and transparent, and had an NCO content of 12.4% and a viscosity of 2615 cP/25° C. This prepolymer was self-emulsifiable.

EXAMPLE 5

100 Parts of the modified HDI A-1 was placed in a reactor equipped with a stirrer, a thermometer, a nitrogen-sealing tube, and a cooler, and thereto were added 10 parts of polyoxyethylene methyl ether (hydroxyl value: 51, made by Toho Chiba Kogyo K. K.), and 10 parts of CO-FA methyl ester. The mixture was heated, and allowed to react at 75° C. for 3 hours. Thereby an isocyanate-terminated prepolymer (E) was obtained which was pale yellow and transparent, and had an NCO content of 16.2% and a viscosity of 2855 cP/25° C. This prepolymer was self-emulsifiable.

EXAMPLE 6

100 Parts of the modified HDI A-1 was placed in a reactor equipped with a stirrer, a thermometer, a nitrogen-sealing tube, and a cooler, and thereto were added 16 parts of methoxyPEG#400, and 10 parts of methyl 12-hydroxystearate (hydroxyl value 160, made by Ito Seiyu K. K.). The mixture was heated, and allowed to react at 75° C. for 3 hours. Thereby an isocyanate-terminated prepolymer (F) was obtained which was pale yellow and transparent, and had an NCO content of 14.1% and a viscosity of 2890 cP/25° C. This prepolymer was self-emulsifiable.

EXAMPLE 7

100 Parts of the modified HDI A-1 was placed a reactor equipped with a stirrer, a thermometer, a nitrogen-sealing tube, and a cooler, and thereto were added 15 parts of potassium ricinoleate (made by Ito Seiyu K. K.), and 10 parts of CO-FA methyl ester. The mixture was heated, and allowed to react at 75° C. for 3 hours. Thereby an isocyanate-terminated prepolymer (G) was obtained which was pale yellow and transparent, and had an NCO content of 14.4% and a viscosity of 2420 cP/25° C. This prepolymer was self-emulsifiable.

EXAMPLE 8

100 Parts of the modified HDI A-1 was placed in a reactor equipped with a stirrer, a thermometer, a nitrogen-sealing tube, and a cooler, and thereto were added 16 parts of methoxyPEG#400, and 10 parts of CO-FA methyl ester. The mixture was heated, and allowed to react at 75° C. for 3 hours. Thereby an isocyanate-terminated prepolymer (H) was obtained which was pale yellow and transparent, and had an NCO content of 13.9% and a viscosity of 3030 cP/25° C. This prepolymer was self-emulsifiable.

EXAMPLE 9

85 Parts of the modified HDI A-1 and 15 parts of isocyanurate form of IPDI of the following formula,

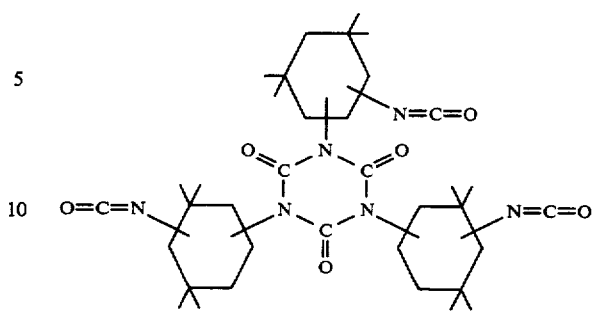

(IPDI-T1890/100, supplied from Daicel Huels K. K., NCO content: 17.0%) were placed in a reactor equipped with a stirrer, a thermometer, a nitrogen-sealing tube, and a cooler, and thereto were added 16 parts of methoxyPEG#1000, and 10 parts of CO-FA methyl ester. The mixture was heated, and allowed to react at 75° C. for 3 hours. Thereby an isocyanate-terminated prepolymer (I) was obtained which was pale yellow and transparent, and had an NCO content of 14.8% and a viscosity of 3200 cP/25° C. This prepolymer was self-emulsifiable.

Comparative Example 1

100 Parts of the modified HDI A-1 was placed in a reactor equipped with a stirrer, a thermometer, a nitrogen-sealing tube, and a cooler, and 4 parts of methoxyPEG#400 was added thereto. The mixture was heated, and allowed to react at 75° C. for 3 hours. Thereby an isocyanate-terminated prepolymer (J) was obtained which was pale yellow and transparent, and had an NCO content of 19.9% and a viscosity of 2408 cP/25° C. This prepolymer was self-emulsifiable.

Comparative Example 2

100 Parts of the modified HDI A-1 was placed in a reactor equipped with a stirrer, a thermometer, a nitrogen-sealing tube, and a cooler, and 16 parts of methoxyPEG#400 was added thereto. The mixture was heated, and allowed to react at 75° C. for 3 hours. Thereby an isocyanate-terminated prepolymer (K) was obtained which was pale yellow and transparent, and had an NCO content of 16.5% and a viscosity of 2140 cP/25° C. This prepolymer was self-emulsifiable.

[Evaluation of Water-Dispersion Stability, NCO Stability in Water Dispersion, and Coating Properties]

To 100 parts of each self-emulsifiable polyisocyanate prepolymer of Example 1 to 9 and Comparative Examples 1 and 2, was added 500 parts of water. The combined matter was mixed sufficiently by means of a labomixer to obtain an aqueous dispersion. The dispersion was evaluated for water dispersion stability, change of the NCO content with lapse of time after preparation of the dispersion (in Table 1 and FIG. 1, hours for disappearance of the NCO group is shown by the term "NCO-remaining time"), and the coating state and the adhesiveness of a coating film which was formed on a calcium silicate plate by application of the aqueous dispersion one hour after the dispersion preparation and drying at room temperature for one hour and at 80° C. for 3 hours.

The results of the evaluation are shown in Table 1. The effect of introduction of CO-FA methyl ester, a lipophitic chain, is shown in FIG. 1 by reference to Examples 1 to 3 and Comparative Example 2 where the kind and the introduced amount of the hydrophilic surfactant (b-1) is the same.

As shown above, the introduction of a lipophilic chain raised the chemical stability of the NCO group with maintaining the water dispersibility.

[Effects for Improvement of Physical Properties by Addition of Self-Emulsifiable Isocyanate-Terminated Prepolymer]

The films formed in Examples 10 and 11 and Comparative Examples 3 and 4 shown below were evaluated for the heat resistance and the hot-water resistance. The heat resistance was measured by heating the film punched out with the dumbbell die No. 2 of JIS K.6301 under a load of 5 g/100 μm at a heating rate of 5° C. min. The temperature at which the test film specimen is suddenly elongated or broken was defined as the softening temperature. The hot-water resistance was evaluated by water absorption properties measured by weight increase after a predetermined time of immersion in water at 40° C. The results are shown in Table 2.

As shown in Table 2, the addition of the isocyanate-terminated prepolymer improved greatly the heat resistance and the hot-water resistance of the film prepared by the addition of the isocyanate-terminated prepolymer.

EXAMPLE 10

5 Parts of the self-emulsifiable polyisocyanate prepolymer prepared in Example 4 was added to 100 parts of a urethane emulsion A (solid content: 30%, viscosity: 100 cP/25° C.). The combined matter was stirred and mixed with a glass rod, thereby a dispersion being readily formed. A film was prepared from this dispersion by the below described procedure. The resulting dispersion was allowed to stand for one hour and applied on a release paper (EV120II®) supplied from LINTEC K. K. attached to a glass plate to give a film 80 μm thickness with curing under the conditions; at 25° C., 65% RH for 30 minutes, at 80° C. for 30 minutes, and further at 25° C., 65% RH for 3 days.

The above urethane emulsion A was prepared by the following procedure.

461.1 parts of N-980N (polycabonate type polyester, M. W.=2000, made by NIPPON POLYURETHANE INDUSTRY CO., LTD.) 150.1 parts of IPDI and 0.06 parts of dibutyltin dilaurate were placed in a reactor equipped with a stirrer, a thermometer, a nitrogen-sealing tube, and a cooler. The mixture was heated, and allowed to react at 75° C. for 2 hours to give a reaction liquid having an NCO content of 6.0%. Then, the reaction liquid was cooled to 40° C. Subsequently, 29.6 parts of dimethylol propionic acid, 22.3 parts of triethyl amine, and 252.8 parts of acetone were added. The resulting mixture was allowed to react at 40° C. for 3 hours to give a reaction liquid having an NCO content of 1.8%. Further, 273.2 parts of acetone, 30.3 parts of isophorone diamine and 2.4 parts of monoethanolamine were added to the reaction liquid. The mixture was allowed to react for 20 minutes. 1562.5 parts of water was added to the mixture, stirring was carried out at high speed to effect phase reversal. Acetone was distilated off from the liquid to give a urethane emulsion having a viscosity of 100 cP/25° C.

EXAMPLE 11

5 Parts of the self-emulsifiable polyisocyanate prepolymer prepared in Example 4 was added to 100 parts of an acrylic emulsion A WA-1-15 ND (solid content: 50% viscosity: 300 cP/25° C., made by Ajia Kogyo K. K.). The combined matter was stirred and mixed with a glass rod, thereby a dispersion being readily formed. A film was prepared from this dispersion under the same conditions as in Example 10.

Comparative Example 3

A film was formed from the urethane emulsion A under the same conditions as in Example 10.

Comparative Example 4

A film was formed from the acrylic emulsion A under the same conditions as in Example 10.

TABLE 1

| Self-emulsifiable isocyanate-terminated prepolymer | Example | | | | | |
|---|---|---|---|---|---|---|
| | 1 | 2 | 3 | 4 | 5 | 6 |
| Aqueous dispersion stability | Good | Good | Good | Good | Good | Good |
| NCO-remaining time (Hours) | 3.0 | 4.0 | 5.0 | 7.0 | 5.0 | 4.5 |
| State of coating | Excellent | Excellent | Good | Excellent | Excellent | Excellent |
| Adhesiveness | Good | Excellent | Excellent | Excellent | Excellent | Excellent |

| Self-emulsifiable polyisocyanate-terminated prepolymer | Example | | | Comparative Example | |
|---|---|---|---|---|---|
| | 7 | 8 | 9 | 1 | 2 |
| Aqueous dispersion stability | Good | Good | Good | Poor | Good |
| NCO-remaining time (Hours) | 5.0 | 5.0 | 4.5 | 5.0 | 2.5 |
| State of coating | Excellent | Excellent | Excellent | Poor | Excellent |
| Adhesiveness | Good | Excellent | Good | Poor | Excellent |

TABLE 2

| Film | Comparative Example 3 | Example 10 | Comparative Example 4 | Example 11 |
|---|---|---|---|---|
| Softening point (°C.) | 105 | 180 | 120 | 160 |
| Water absorption ratio (%)* | | | | |
| 3 Days later | 10.4 | 0.0 | 22.1 | 0.0 |

TABLE 2-continued

| Film | Comparative Example 3 | Example 10 | Comparative Example 4 | Example 11 |
| --- | --- | --- | --- | --- |
| 6 Days later | 30.5 | 1.1 | 26.4 | 2.5 |
| 10 Days later | 37.1 | 1.3 | 30.8 | 3.0 |

*Water absorption ratio = [(Sample weight (g) after immersion) − (Sample weight (g) before immersion)] × 100 ÷ (Sample weight (g) before immersion)

What is claimed is:

1. A self-emulsifiable isocyanate-terminated prepolymer, having an average NCO functionality of from 2.0 to 3.5, which is prepared from:
   (a) a polyisocyanate comprising aliphatic polyisocyanates, alicyclic polyisocyanates, or aromatic polyisocyanates, or a combination of said polyisocyanates,
   (b-1) a hydrophilic surfactant having at least one active hydrogen group capable of reacting with an isocyanate group, and
   (b-2) a compound selected from the group consisting of (i) an aliphatic compound having at least 8 carbon atoms, and (ii) a fatty acid ester prepared from a fatty acid and a hydroxyl-group-containing compound in which the total number of carbon atoms of the fatty acid and the hydroxyl-group-containing compound is 8 or more, wherein the aliphatic compound (i) and the fatty acid ester (ii) each have at least one active hydrogen group capable of reacting with an isocyanate group.

2. The self-emulsifiable isocyanate-terminated prepolymer of claim 1, wherein the polyisocyanate component (a) is derived from a diisocyanate selected from the group consisting of 1,6-hexamethylene diisocyanate and isophorone diisocyanate, said polyisocyanate comprising an isocyanurate, a uretdione, a urethane, an allophanate, a biuret, a carbodiimide, a uretonimine, or a combination of two or more of the foregoing moieties.

3. The self-emulsifiable isocyanate-terminated prepolymer of claim 1, wherein the hydrophilic surfactant (b-1) is a polyethylene ether alcohol having at least three polyethylene oxide units.

4. An aqueous coating composition, comprising:
   (c) water, and
   (d) the self-emulsifiable isocyanate-terminated prepolymer of claim 1.

5. An aqueous coating composition, comprising:
   (c) water, and
   (d) the self-emulsifiable isocyanate-terminated prepolymer of claim 2.

6. An aqueous coating composition, comprising:
   (c) water, and
   (d) the self-emulsifiable isocyanate-terminated prepolymer of claim 3.

7. An aqueous adhesive composition, comprising:
   (e) an aqueous adhesive based on a water-soluble high polymer or an aqueous emulsion, or both, and
   (f) the self-emulsifiable isocyanate-terminated prepolymer of claim 1.

8. An aqueous adhesive composition, comprising:
   (e) an aqueous adhesive based on a water-soluble high polymer or an aqueous emulsion, or both, and
   (f) the self-emulsifiable isocyanate-terminated prepolymer of claim 2.

9. An aqueous adhesive composition, comprising:
   (e) an aqueous adhesive based on a water-soluble high polymer or an aqueous emulsion, or both, and
   (f) the self-emulsifiable isocyanate-terminated prepolymer of claim 3.

10. The prepolymer of claim 2 wherein the polyisocyanate comprises an isocyanurate and a uretdione.

11. The prepolymer of claim 1 wherein the polyisocyanate (a) comprises, or is derived from, an aromatic diisocyanate.

12. The prepolymer of claim 11 wherein the aromatic diisocyanate is selected from the group consisting of phenylene diisocyanate, toluene diisocyanate, xylene diisocyanate, tetramethylxylene diisocyanate, naphthylene diisocyanate, and diphenylmethane diisocyanate.

13. The prepolymer of claim 1 wherein the polyisocyanate (a) comprises, or is derived from, an aliphatic diisocyanate.

14. The prepolymer of claim 13 wherein the aliphatic diisocyanate is 1,6-hexamethylene diisocyanate or 1,12-dodecane diisocyanate.

15. The prepolymer of claim 1 wherein the polyisocyanate (a) comprises, or is derived from, an alicyclic diisocyanate.

16. The prepolymer of claim 15 wherein the alicyclic diisocyanate is selected from the group consisting of cyclohexane diisocyanate, dicyclohexylmethane diisocyanate and isophorone diisocyanate.

17. The prepolymer of claim 1 wherein the hydrophilic surfactant (b-1) is a polyalkylene ether alcohol or a polyoxyalkylene fatty acid ester.

18. The prepolymer of claim 1 wherein the hydrophilic surfactant (b-1) is: (i) an anionic compound selected from the group consisting of fatty acid salts, sulfonate acid salts, phosphate esters, and sulfate esters; (ii) a cationic compound selected from the group consisting of primary amine salts, secondary amine salts, tertiary amine salts, quaternary ammonium salts, and pyridinium salts; or, (iii) an amphoteric compound.

19. The prepolymer of claim 1 wherein the compound (b-2) comprises an aliphatic compound (i) selected from the group consisting octyl alcohol, capryl alcohol, nonyl alcohol, decyl alcohol, undecyl alcohol, lauryl alcohol, tridecyl alcohol, myristyl alcohol, pentadecyl alcohol, cetyl alcohol, and cinnamyl alcohol.

20. The prepolymer of claim 1 wherein the compound (b-2) comprises a fatty acid ester (ii) prepared from: (a) a fatty acid selected from the group consisting of α-hydroxypropionic acid, hydroxysuccinic acid, dihydroxysuccinic acid, ε-hydroxypropane-1,2,3-tricarboxylic acid, hydroxyacetic acid, α-hydroxybutyric acid, hydroxystearic acid, ricinolic acid, ricinoelaidic acid, ricinostearolic acid, salicylic acid, and mandelic acid; and (b) a hydroxyl-group-containing compound selected from the group consisting of methyl alcohol, ethyl alcohol, propyl alcohol, isopropyl alcohol, butyl alcohol, dodecyl alcohol, and lauryl alcohol.

21. The prepolymer of claim 1 wherein the compound (b-2) comprises a combination of the aliphatic compound (i) and the fatty acid ester (ii).

22. The prepolymer of claim 1 wherein the compound (b-2) is included in an amount of from 0.1 to 25.0 mol % based on the active hydrogen content of the compound (b-2) relative to the NCO content of the polyisocyanate (a).

23. The prepolymer of claim 22 wherein the compound (b-2) is included in an amount of from 2.0 to 15.0 mol %.

24. The prepolymer of claim 1 wherein the hydrophilic surfactant (b-1) is included in an amount of from 1.0 to 30.0 mol % based on the active hydrogen content of the hydrophilic surfactant (b-1) relative to the NCO content of the polyisocyanate (a).

25. The prepolymer of claim 24 wherein the hydrophilic surfactant (b-1) is included in an amount of from 8.0 to 20.0 mol %.

* * * * *